(12) United States Patent
Loce et al.

(10) Patent No.: US 8,767,254 B2
(45) Date of Patent: Jul. 1, 2014

(54) PROCESSING IMAGES TO BE BLENDED WITH REFLECTED IMAGES

(75) Inventors: Robert P. Loce, Webster, NY (US); Edgar A. Bernal, Webster, NY (US); Edul N. Dalal, Webster, NY (US)

(73) Assignee: Xerox Corporartion, Norwalk, CT (US)

( * ) Notice: Subject to any disclaimer, the term of this patent is extended or adjusted under 35 U.S.C. 154(b) by 1091 days.

(21) Appl. No.: 12/775,019

(22) Filed: May 6, 2010

(65) Prior Publication Data

US 2011/0273730 A1 Nov. 10, 2011

(51) Int. Cl.
*G06F 15/00* (2006.01)
(52) U.S. Cl.
USPC ........... 358/1.9; 358/3.06; 382/118; 382/167; 382/261; 382/279; 382/284
(58) Field of Classification Search
None
See application file for complete search history.

(56) References Cited

U.S. PATENT DOCUMENTS

| | | | | |
|---|---|---|---|---|
| 5,418,899 | A * | 5/1995 | Aoki et al. | 345/668 |
| 5,579,444 | A * | 11/1996 | Dalziel et al. | 700/259 |
| 2003/0190090 | A1 * | 10/2003 | Beeman et al. | 382/284 |
| 2005/0248655 | A1 * | 11/2005 | Kitamura et al. | 348/187 |
| 2008/0068660 | A1 * | 3/2008 | Loce et al. | 358/3.06 |
| 2010/0188478 | A1 * | 7/2010 | Robinson et al. | 348/14.16 |

FOREIGN PATENT DOCUMENTS

EP 0447197 A2 9/1991

OTHER PUBLICATIONS

Jun Zhang, The Mean Field Theory in EM Procedures for Blind Markov Random Field Image Restoration, Jan. 1993, vol. 2, No. 1.*
Raja Balasubramanian, Colorimetric Modeling of Binary Color Printers, 1995.*
A. Pentland, "A New Sense for Depth of Field," IEEE Transactions on Pattern Analysis and Machine Intelligence, pp. 988-994, (1987).

* cited by examiner

*Primary Examiner* — Houshang Safaipour
*Assistant Examiner* — Idowu O Osifade
(74) *Attorney, Agent, or Firm* — Fay Sharpe LLP

(57) ABSTRACT

Images are prepared for blending with a reflection. Angles of incidence and angles or reflection lead to reflections of a viewer appearing to be different than actual size. Accordingly, image preparation can include scaling images of objects to be blended with a reflection to an appropriate size. For a flat specular surface the size is one half the size the object would be if the object were sized to be associated with the feature that is reflected. A viewer will focus on the reflection of the viewer at an object plane. An image associated with the specular surface will be blurred. Accordingly, the preparation can include compensating for the blurring. Preparation can also include reducing an area coverage of the image of the object to no more than about fifty percent of the region of the refection to provide space for the reflection.

16 Claims, 11 Drawing Sheets

| -1 | 0 | 1 |
|----|---|---|
| -2 | 0 | 2 |
| -1 | 0 | 1 |

| 1  | 2  | 1  |
|----|----|----|
| 0  | 0  | 0  |
| -1 | -2 | -1 |

FIG. 7

| -1 | 0 | 1 |
|----|---|---|
| -1 | 0 | 1 |
| -1 | 0 | 1 |

| -1 | -1 | -1 |
|----|----|----|
| 0  | 0  | 0  |
| 1  | 1  | 1  |

FIG. 8

| -1 | 0  |
|----|----|
| 0  | -1 |

| 0  | 1 |
|----|---|
| -1 | 0 |

FIG. 9

| 0 | 1 | 1 | 2   | 2   | 2   | 1 | 1 | 0 |
|---|---|---|-----|-----|-----|---|---|---|
| 1 | 2 | 4 | 5   | 5   | 5   | 4 | 2 | 1 |
| 1 | 4 | 5 | 3   | 0   | 3   | 5 | 4 | 1 |
| 2 | 5 | 3 | -12 | -12 | -12 | 3 | 5 | 2 |
| 2 | 5 | 0 | -24 | -40 | -24 | 0 | 5 | 2 |
| 2 | 5 | 3 | -12 | -24 | -12 | 3 | 5 | 2 |
| 1 | 4 | 5 | 3   | 0   | 3   | 5 | 4 | 1 |
| 1 | 2 | 4 | 5   | 5   | 5   | 4 | 2 | 1 |
| 0 | 1 | 1 | 2   | 2   | 2   | 1 | 1 | 0 |

FIG. 10

PROCESSING IMAGES TO BE BLENDED WITH REFLECTED IMAGES

BACKGROUND

The presently disclosed embodiments are directed toward processing images to be printed on or to be associated with specular or mirrored substrates or media so that a reflected image can be combined with the printed image. Embodiments will be described with reference to novelty items product packaging, such as cereal boxes. However, embodiments may be employed wherever it is desired to combine a printed image with a reflected image.

Accidental and intentional double exposures resulting in combined images are known. Additionally, mathematical techniques for combining digital images have been described. For example, European Patent Application 0447197 A2 by Joel D. Gengler, titled "Digital Image Blending on a Pixel-by-Pixel Basis", discusses a digital image blending circuit which lets a user draw several planar images and then sum them together. However, these techniques are not readily adaptable to reflected images and novelty items and product packaging.

BRIEF DESCRIPTION

A method for processing an image for association with a specular medium to improve a manner in which a printed version of the processed image would appear to blend with a reflection of an anticipated viewer of the printed version of the image can include receiving the image, processing data based on the image to compensate for anticipated blurring due to the viewer focusing on the reflection of the viewer rather than focusing on the printed version of the processed image, wherein the processing includes at least one of sharpening, edge mapping and edge enhancing, thereby generating a transformed version of the image. The method can also include printing the printed version of the image based on the transformed version of the image on at least one of: the specular medium, a transparent overlay to be applied to the specular medium and a transfer medium to be used in transferring the printed transformed image to the specular medium.

Embodiments can include determining an anticipated apparent size of a portion of the reflected image of the viewer to be blended by observation with an object depicted in the printed version of the image and scaling data based on the image so that the depicted object would fit the anticipated apparent size of the reflected image, thereby generating a scaled version of the image. The data that is scaled can be based on the transformed version of the image or, for example the data that is processed can be based on the scaled version of the image. For instance, in these embodiments, printing the printed version of the image can be based on a scaled and transformed version of the image.

An image processor that is operative to process an image for association with a specular medium to improve a manner in which a printed version of the processed image would appear to blend with a reflection of an anticipated viewer of the printed version of the processed image can include a blur compensator and a reflection scaler. Embodiments can also include a printer.

For example, the blur compensator can be operative to receive data based on the image and process the data based on the image to compensate for anticipated blurring due to the viewer focusing on the reflection of the viewer rather than focusing on the printed version of the image. The processing can include sharpening, edge mapping and/or edge enhancing. Blur compensation generates a transformed version of the image.

The reflection scaler can be operative to determine an anticipated apparent size of a portion of the reflected image of the viewer to be blended by observation with an object depicted in the printed version of the image and to scale data based on the image so that the depicted object would fit the anticipated apparent size of the reflected image, thereby generating a scaled version of the image. The data that is scaled can be based on the transformed version of the image generated by the blur compensator or the data that is processed by the blur compensator can be based on the scaled version of the image. In either kind of embodiment or application a scaled and transformed version of the image can be generated.

For instance, the printer can be operative to printing the printed version of the image based on the scaled and transformed version of the image on at least one of: the specular medium, a transparent overlay to be applied to the specular medium and a transfer medium to be used in transferring the printed image to the specular medium.

BRIEF DESCRIPTION OF THE DRAWINGS

FIGS. 7-10 are illustrative kernels that can be convolved with image data to generate edge maps.

DETAILED DESCRIPTION

Figure 1:
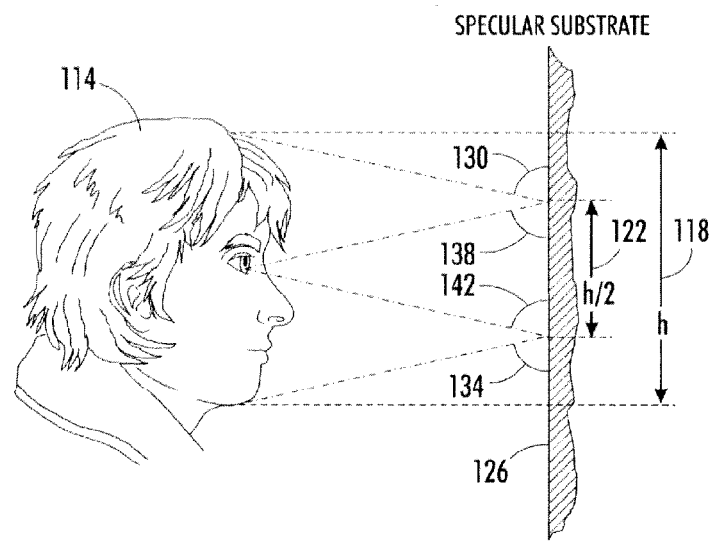
FIG. 1 is a diagram illustrating a perceived size reduction associated with a reflection.

Referring to FIG. 1, one issue to be considered when preparing an image to be combined or blended with a reflected image of an observer 114 is that of scaling.

For instance, if a dimension 118 of an aspect of an object being observed is h, the observed length of that dimension in the reflection is ½ h (122). For instance, light from the top of the head and bottom of the jaw of an observer is received at a mirror or specular substrate 126 at respective angles of incidence 130, 134. That light is reflected by the specular substrate 126 at respective similar angles of reflection 138, 142. For example, this reflected scaling holds under the assumption that the specular substrate 126 is flat and that the contour of the reflected object (e.g., 114) lies on a plane in space that is approximately parallel to the substrate. When the reflected object does not lie approximately parallel to the substrate 126, a different amount of scaling will be observed. If the specular substrate is not flat (e.g., spherical or cylindrical), different scaling factors and/or geometric transformations might need to be used.

Another aspect of preparing an image for association with specular substrates, such as mirrors or aluminized Mylar or transparent material to be overlaid upon a specular medium, is related to blurring or defocusing associated with the gaze of the observer.

Figure 2:
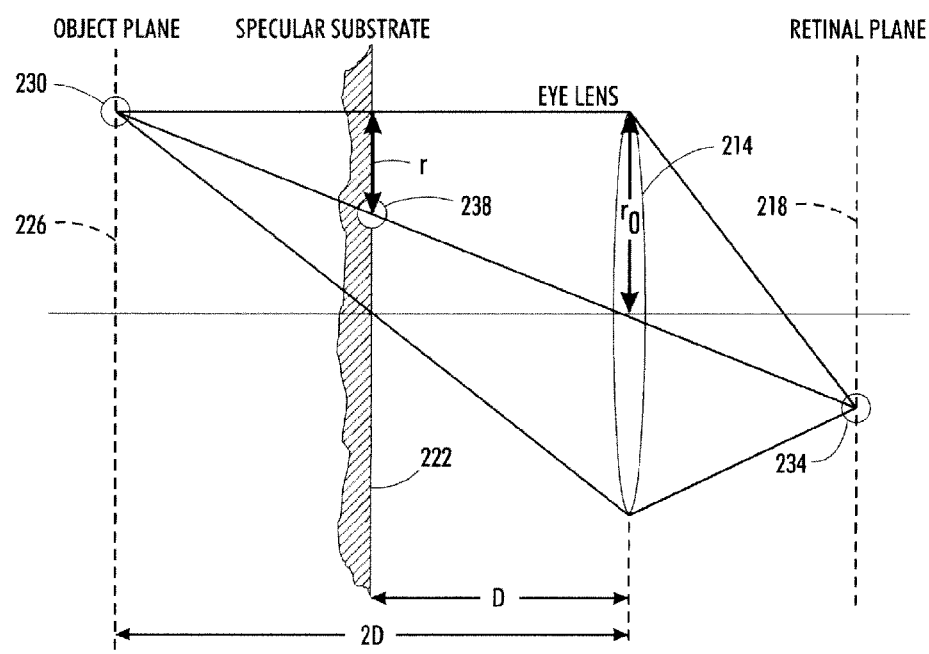
FIG. 2 is a diagram illustrating blur of an image associated with a specular substrate associated with an observer focusing on a reflection apparently at an object plane.

For example, referring to FIG. 2, the visual system of a human observer includes a lens 214 and a retina providing an image or retinal plane 218. When a human observer observes a reflection of the human observer in a mirror or specular substrate 222 spaced a distance D from the observer, the reflected image appears to be from a source or object plane 226 spaced an additional distance D behind the surface of the specular substrate 222. Accordingly, the apparent position of the reflected image is a distance 2D from the observer. If the observer focuses on the observer's reflection at the object plane, then any single point on the object plane (e.g., 230) will be projected as a single point 234 on the image or retinal plane 218. Any point (e.g., 238) on the specular substrate 222 will be out of focus and blurred. That is, a point (e.g., 238) of an image rendered on or near the specular substrate will be projected on the retinal plane 218 not as a point, but as a circular patch. The radius r of the blur or circular patch can be found by similarity of triangles according to Equation 1, below, wherein $r_0$ is the radius of the lens 214 of the eye.

$$\frac{r_0}{2D} = \frac{r}{D} \qquad \text{Eq. 1}$$

Consequently, $r=r_0/2$. In an adult human having a lens that is approximately 10 mm in diameter, $r_0=5$ mm and h=2.5 mm. If the image prepared for rendering on, or to be associated with, the specular substrate 222 is rendered at a dot resolution of 600 dots per inch (dpi), the blurred image of the point 238 on or near the specular substrate 222 will have a radius of approximately 59 dots.

In summary, a 600 dpi digital image y(m,n) located at half the distance from an observer (e.g., at the specular substrate 222) of an object (e.g., the reflection apparently located at the object plane 226) that is in focus at the focal or retinal plane 218 undergoes a blurring process that produces an image $\bar{y}(m,n)$ and that can be modeled by a two-dimensional convolution with a blurring filter h(m,n) as expressed in Equation 2.

$$\bar{y}(m,n) = y(m,n) * h(m,n) \qquad \text{Eq. 2}$$

The two-dimensional blurring filter (i.e., h(m,n)) is typically modeled by a zero-mean, Gaussian kernel whose variance is equal to the radius of the point spread function r from Eq. 1, as illustrated in Eq. 3 wherein r is taken to be 59 dot spaces.

$$h(m,n) = \frac{1}{2\pi r} e^{-\frac{m^2+n^2}{2r}} = \frac{1}{118\pi} e^{-\frac{m^2+n^2}{118}} \qquad \text{Eq. 3}$$

In theory, for an image located halfway between an object in focus located at an object plane (e.g. 226) and the eye of an observer (e.g., 114, 214), to be perceived without any blur, the image would have to undergo a sharpening process via a convolution with the inverse filter of the aforementioned Gaussian. Since the exact inverse convolution operator in the spatial domain is not known, it is customary to perform this operation in the frequency domain:

$$\tilde{Y}(u,v) = \frac{\bar{Y}(u,v)}{H(u,v)} \qquad \text{Eq. 4}$$

where $\bar{Y}(u,v)$ and H(u,v) are the frequency representations of $\bar{y}(m,n)$ and h(m,n) respectively, and $\tilde{Y}(u,v)$ is the frequency domain representation of the sharpened image. While this sharpened image can be mathematically computed, it is not guaranteed that the resulting spatial domain image $\tilde{y}(m,n)$ will be an image per se. That is, the resulting image may not have pixel values within the appropriate range (e.g., 0-255).

Accordingly, approximations to this invert Gaussian process, which are more likely to result in actual images that can be displayed and printed by real-world devices, are useful. Examples of such approximations include over-sharpening via linear filtering, edge mapping and edge accentuation.

Yet another aspect of preparing an image to be rendered in association with a mirror or specular substrate is the issue of area coverage. That is, it is important that a significant portion of the viewer's reflection be visible to the viewer. For instance, some desired fraction (e.g., 50%) of the viewed combined image should be made up of a reflection of the observer. Some images, such as, for example, an image of a pair of spectacles or an image of a mustache or an image of a nose might be small compared to an intended target reflected image (e.g., the observer's face). Accordingly, such images might not need to be processed with regard to the issue of area coverage.

Other images, for example, those images intended to overlay larger portions of a reflected image, may benefit from further processing. For example, some images can be shifted toward the desired area coverage through structure-on-structure or dot-on-dot halftoning. Typically the color binarization or quantization process results in spots of colorant, such as cyan, magenta, yellow and black colorants being laid down in adjacent spots of varying size on print media. In structure-on-structure halftoning, a structure (e.g., dot, line segment or other shape or structure) of a first colorant is laid on top of a structure of a second colorant. Accordingly, for a given pixel, processing an image according to structure-on-structure halftoning results in an image wherein less of the print media is covered by colorant. Therefore, when an image processed according to dot-on-dot or other structure-on-structure halftoning is applied to or associated with a specular substrate, more of the specular substrate is uncovered and available to reflect an image of a portion of an observer than would otherwise be available if the image were quantized according to other binarization or quantization techniques.

Additionally, or alternatively, some images may be thinned or have their area coverage reduced through a process of line or edge enhancement. Such image processing techniques are provided, for example, in available image processing software packages. Such packages allow an operator to convert an image to a line form similar to a coarse engraving.

Figure 3:
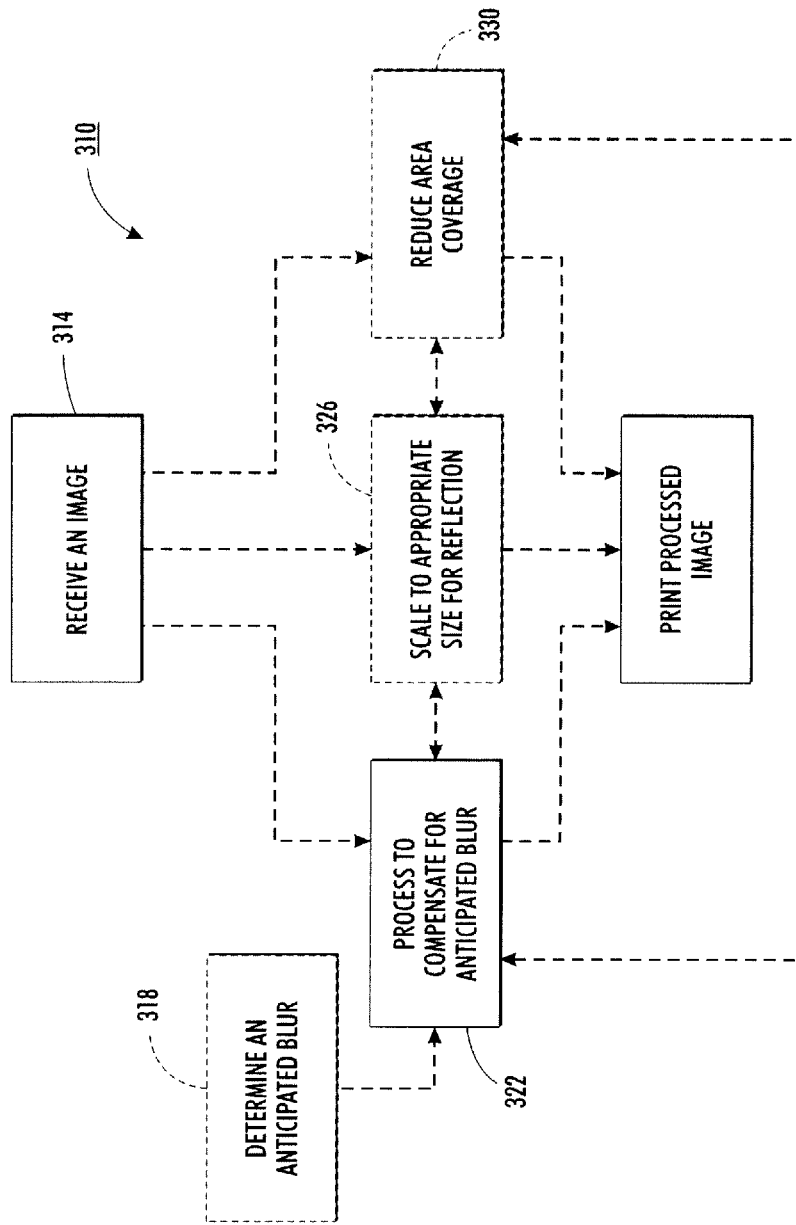
FIG. 3 is a flow diagram outlining a method of processing an image to be associated with a specular substrate and blended with a reflection of an observer.

Accordingly, referring to FIG. 3, a method 310 for processing an image for association with a specular medium to improve a manner in which the image appears to blend with a reflection of an anticipated viewer of a printed version of the processed image can include receiving 314 an image, determining 318 an anticipated blur associated with the eye of the viewer viewing the printed version of the image while focusing on a reflection of at least a portion of the reflection from the specular medium and processing 322 the data based on the image to compensate for the anticipated blurring. Data based on the image may also be scaled 326 to an appropriate size for blending with a reflection and/or be processed to reduce 330 area coverage associated with the image.

The various aspects of the processing (e.g., 322, 326, 330) can be performed in a variety of sequences. Accordingly, the phrase—data based on the image—is used herein to indicate that the data operated on by any particular process can be the original received 314 image data or a version of the image produced by one of the other processes.

For example, in embodiments where scaling 326 is applied, the scaling may be of the original received 314 data or data resulting from processing 322 the received 314 image data to compensate for anticipated blur. Alternatively, scaling 326 may occur earlier in the process 310 and the data processed 322 to compensate for anticipated blur may be the output or result of the scaling 326 process. Where reducing 330 area coverage is achieved through dot-on-dot halftoning alone, it may be convenient to perform the area coverage reduction 330 after all other included processing (e.g., 322, 326) has been performed. However, this is not a requirement. For instance, in some embodiments, scaling 326 or blur compensation 322 may be computationally more efficient when applied to binary or quantized image data. Additionally, area coverage reduction 330 can be achieved by other mechanisms.

For example, edge mapping and some blur compensation techniques 322 can be used to provide area coverage reduction 330. It is to be noted that in some embodiments, area coverage reduction 330 may occur in several stages. Additionally, the stages may occur as part of or before or after other processes.

For instance, area coverage reduction 330 may partially occur as part of a blur compensation 322 process. Then, for example, after a scaling 326 operation, area coverage reduction 330 may continue in the form of, for example, a dot-on-dot halftoning operation.

In each embodiment, the various processes (e.g., 322, 326 and/or 330) may be said to operate on data based on the received 314 image. Where an embodiment includes two of the processes, it is to be understood that one of the processes operates on data based on the received 314 image that is the output of the other process. Where a third process is included, it is to be understood that—data based on the received image—can refer to data output from either of the other two processes or resulting from the sequential application of the other two processes.

Receiving 314 an image can include receiving image data from a scanner resulting from a scanning operation. Alternatively, receiving 314 an image can include receiving an image from an image authoring tool such as a drawing creation tool. Receiving 314 an image can also include receiving an image from a digital camera or photograph make-ready tool. Additionally, images can be received from a network connection or file transfer device such as magnetic or optical media or memory device. The received 314 image may be a contone image or quantized or binary image. Pre-processing may be applied to the received 314 image prior to further processing according to the method 310.

Determining 318 the anticipated blur can include accessing predetermined blur information. Alternatively, an anticipated blur can be calculated based on variable factors. For instance, an anticipated age of an anticipated viewer may have a bearing on anticipated lens geometry. For instance, if the anticipated viewer is a child, the dimensions of the eye may be different than those of an adult discussed above. For instance, the lens of the eye of the anticipated viewer may be smaller or the lens may be anticipated to be more flexible and therefore have a different diameter when viewing a reflection. Accordingly, a measure of blur (e.g., a blur radius r) may be determined 318 or predetermined and stored for recall during the performance of the method 310 according to such parameters.

Processing 322 to compensate for the anticipated 318 blur can, as indicated above, include sharpening the image through inverse convolution with a Gaussian filter whose variance is equal to the radius of the point spread function (e.g., r from Equation 1), as illustrated in Equation 3. However, more practically, over-sharpening via linear filtering, edge mapping and edge enhancement or accentuation based approximations or alternatives of the inverse Gaussian filtering can be applied.

For example, processing 322 to compensate for anticipated blur can include over-sharpening via linear filtering. One spatial method for sharpening is referred to as "the unsharp mask." According to this method, a blurred version of the image $\bar{y}(m,n)$ is subtracted from the original image $y(m,n)$ (e.g., the received 314 image) to obtain a sharpened version of the original image $y_s(m,n)$. This unsharp mask processing is described by Equation 5.

$$y_s(m,n)=y(m,n)-\bar{y}(m,n) \qquad \text{Eq.5}$$

Figure 4:
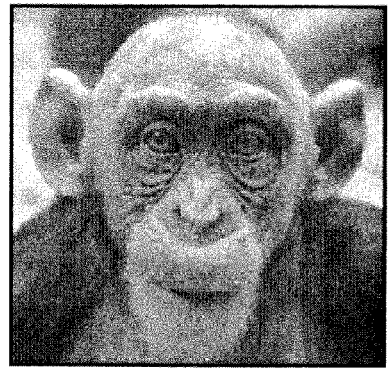
FIG. 4 represents a first input image.
Figure 5:
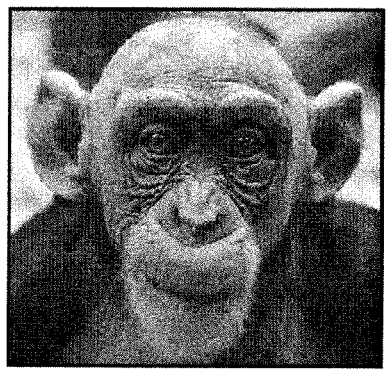
FIGS. 5 and 6 represent sharpened versions of the image of FIG. 4.

FIGS. 4 and 5 illustrate a result of processing 322 according to the unsharp mask. FIG. 4 represents an original or received 314 image. FIG. 5 represents a sharpened version of the received 314 image resulting from processing 322 according to the unsharp mask of Equation 5. It should be noted that FIG. 5 is illustrative of the effect of the unsharp mask only and is not meant to reflect an image suitable for association with a specular medium to be blended with a reflection of a human viewer. The sharpening effect can be further enhanced by repeatedly subtracting the blurred image from successive sharpened versions of the image. Alternatively, a coefficient can be applied to the pixel values of the blurred image thereby amplifying the effect of the blurred image on the original received 314 image and lessening the need for repeated subtractions.

A variation on Equation 5 is represented by Equation 6.

$$y_s(m,n)=Ay(m,n)-\bar{y}(m,n) \qquad \text{Eq.6}$$

Figure 6:
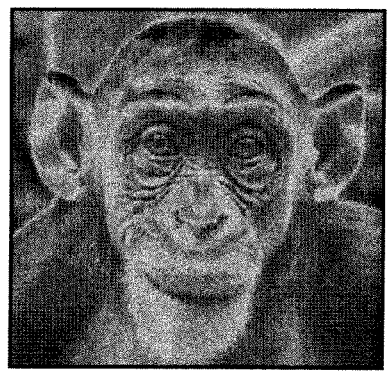

We refer to the filter of Equation 6 as a high-boost filter. In the high-boost filter, pixel values of the original received 314 image are multiplied by a coefficient having a value greater than 1, which tends to increase the contrast of the image. The blurred image is subtracted from this contrast-enhanced image. Again, the subtraction of the blurred image can be applied multiple times. Additionally, or alternatively, a multiplier can be applied to the pixel values of the blurred image to enhance the effect of the blurred image on the received 314 or contrast-enhanced image. FIG. 6 illustrates the effect of applying the high-boost filter of Equation 6 with the coefficient A applied to the received 314 image set to 2.5.

Edge mapping and edge enhancement are additional processes 322 that can be applied to blur compensation, as is discussed further below.

Scaling 326 data based on the received 314 image involves the determination of a scaling factor. The scaling factor may be determined by a system operator who has knowledge of the current renderable size of the image and a target size of the image. Alternatively, image recognition techniques may be applied to the image data whereby components of a document or image processing system identify one or more objects depicted in the received 314 image and scale the image so that the one or more objects are the appropriate size for blending with a reflection of a selected target viewer.

For example, an image processing system may include a database associating appropriate sizes with a set of detectable objects. For instance, where a target specular surface or substrate will be included on the side of a drink box, the target viewer may be anticipated to be a young child. Where images are intended to be overlayed and visually blend with a reflection of the face of such a young child, a database may include information regarding dimensions of a typical or average young child's face. Where an object is depicted in a received image is recognized as an object typically associated with or aligned with the eyes, scaling 326 that image may include accessing typical eye separation dimensions and scaling data associated with the received 314 image so that a center line associated with portions associated with each eye are separated by one-half the typical eye separation dimension. Alternatively, the database may directly associate such a recognizable object with the appropriate size for a young child and/or for an adult. Additional facial landmark dimensions can be associated with other recognizable objects. For instance, objects recognized as being blendable with a reflection of an entire face may be scaled to be rendered at one-half the height and/or width of a typical face of the selected target observer if the target specular substrate is anticipated to be flat. Objects recognized as being associated with or overlayable upon a reflection of a chin may be scaled 326 so that the identified object in the received 314 image is rendered at a width that approximates one-half the width of a chin of an anticipated target viewer.

If necessary, the scaling 326 operation can decrease the size of an object included in the received 314 image data by down sampling data related to the received 314 image. Image size can be increased by up sampling or interpolation. Down sampling can be achieved by decimation or discarding pixels or by operations that map multiple pixels into a single pixel such as averaging or weighted sums. Up sampling introduces additional pixels based on information from pixels included in the data being processed. For example, a pixel might be duplicated in a process known as nearest neighbor interpolation. Additionally, or alternatively, bilinear or bicubic interpolation can be used to determine an appropriate value for a newly added pixel based on the values of pixels neighboring the location of the added pixel.

Edge mapping can be used to reduce 330 area coverage and/or as a process 322 to compensate for anticipated blur. Edge detection or edge mapping can be achieved by a spatial convolution of data based on a received 314 image with a kernel that approximates a derivative operation.

For example, first order derivative filters and/or second order or Laplacian filters can be used. Second-order derivative filters are used in low-noise conditions or after the application of a smoothing filter. Some edge detection or mapping methods applicable to the blur compensation process 322 and/or area coverage reduction process 330 include the Sobel, Prewitt, Roberts, zero-cross, Canny, and Laplacian of Gaussian methods. Sobel, Prewitt and Roberts use linear filters that estimate the gradients in the x and y direction, $G_x$ and $G_y$. A gradient magnitude is then calculated as the magnitude of the vector $(G_x, G_y)$. Kernels that can be used in the Sobel method are depicted in FIG. 7. Kernels that can be used in the Prewitt method are depicted in FIG. 8, and kernels that can be used in the Roberts method are depicted in FIG. 9.

Where the kernels include an odd number of elements, the convolution is carried out by associating the center coefficient of the kernel with a target pixel and the remaining coefficients with neighboring pixels in the data being processed. Each pixel value in the data is multiplied by its respective coefficient to generate a product of the respective coefficients and pixel values. The result of the convolution for that target pixel is the sum of all of the products. When the kernels have an even number of elements in one or both directions, the processing is similar but the result is associated with a position in the output image that is offset from and between the position of the pixels in the data being processed.

A kernel useful in performing edge mapping according to the Laplacian of Gaussian technique is depicted in FIG. 10. The Laplacian kernel is a discreet approximation to a second-derivative. Since second-derivatives are sensitive to noise, the data being processed (i.e., data based on the received 314 image) might beneficially be smooth with a low-pass filter such as a low-pass Gaussian filter before the application of the Laplacian filter. This procedure reduces the presence of high frequency components that can lead to noise after the application of the Laplacian filter.

The zero-cross method searches for zero crossings in the output of a second-derivative operation such as the Laplacian to detect edges.

The Canny edge detector uses a Gaussian filter to remove high frequency image content. Then, first-order derivative filters are used to find $G_x$ and $G_y$, the components of the gradient vector. The magnitude and direction of that vector are used in subsequent procedures. A process referred to as non-maximum suppression can be used to trace the edge and suppress pixels that are considered to be associated with edges by the Canny process but which should not be considered edges because the pixels in question are not of a local maximum value. The image data is analyzed along the image gradient. If a pixel is considered not to be a local maxima or within a tolerance range of a local maxima, it is set to zero.

Figure 11:
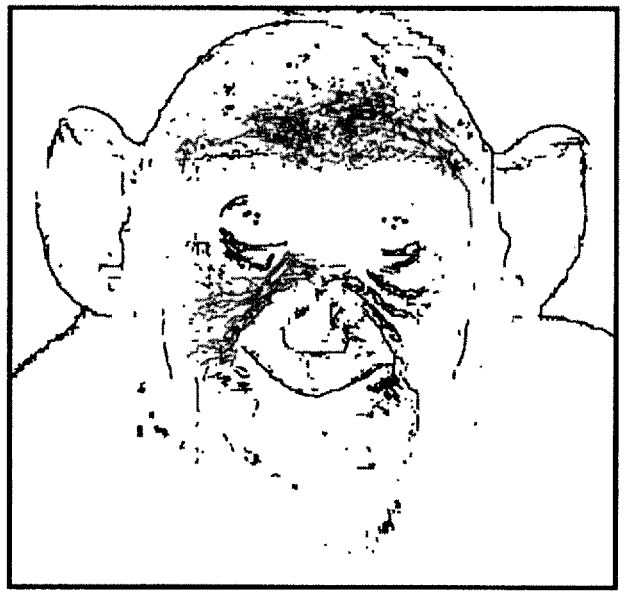
FIGS. 11-16 represent edge maps generated with data based on the image of FIG. 4 according to a various edge mapping methods.
Figure 12:
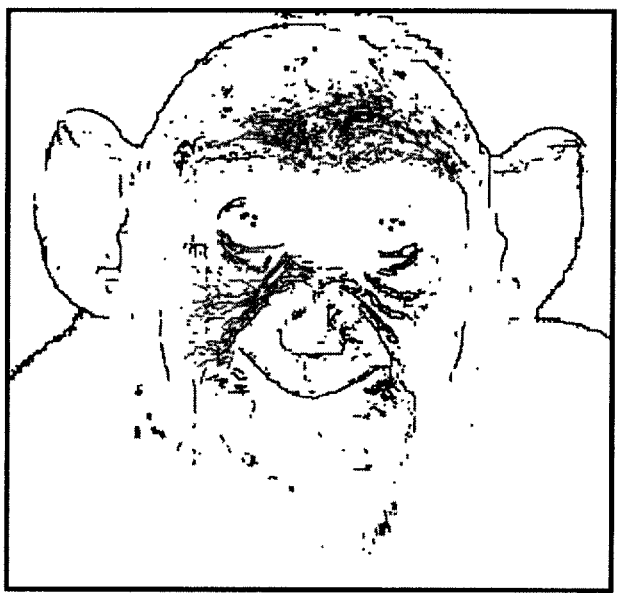
Figure 13:
Figure 14:
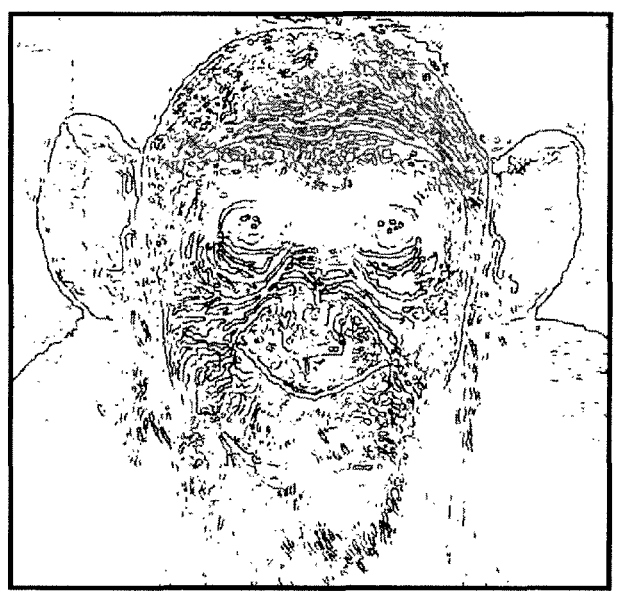
Figure 15:
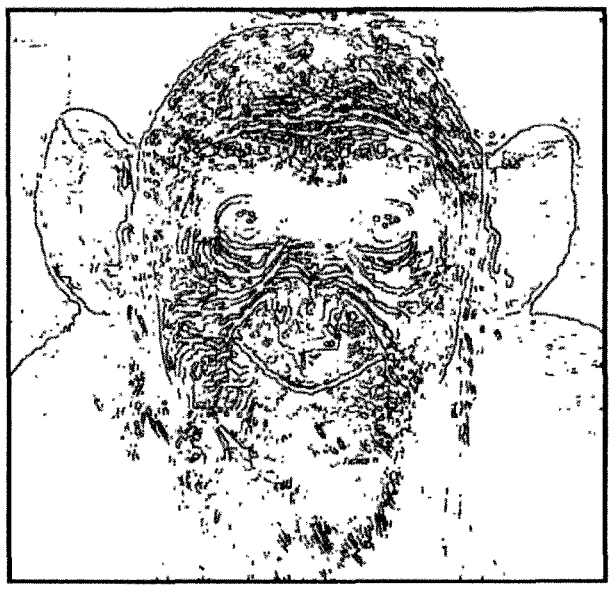
Figure 16:

FIGS. 11-16 illustrate the results of edge mapping according to each of these techniques. FIG. 11 is an edge map of the image of FIG. 4 generated according to the technique of Sobel. FIG. 12 is an edge map of the image of FIG. 4 generated according to the technique of Prewitt. FIG. 13 is an edge map of the image of FIG. 4 generated according to the technique of Roberts. FIG. 14 is an edge map of the image of FIG. 4 generated according to a Laplacian of Gaussian technique. FIG. 15 illustrates an edge map of the image of FIG. 4 generated according to the zero-crossing technique. FIG. 16 illustrates an edge map of the image of FIG. 4 generated according to the Canny method.

As can be seen from the illustrations (FIGS. 11-16), each of these techniques represents a method for reducing 330 the area coverage of the object in the image. Additionally, these edge mapping techniques represent methods of sharpening and therefore processing 322 to compensate for anticipated blur.

Edge enhancement techniques are another class of processes which can be used to reduce 330 area coverage and/or compensate 322 for anticipated blur. For example, a binary mask including edge information is created in a manner similar to that described above with regard to FIGS. 11-16. Then, localized contrast enhancement is performed at pixel locations indicated by the edge mask. For example, pixels identified as being included in an edge might be darkened and pixels neighboring such pixels might be lightened. In some embodiments or applications, contrast reduction can be applied at pixel locations outside those identified by the edge information.

Figure 17:
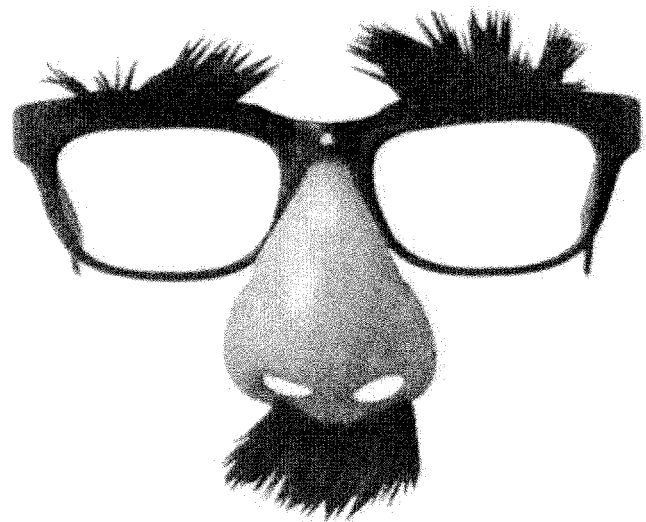
FIG. 17 represents a second input image.
Figure 18:
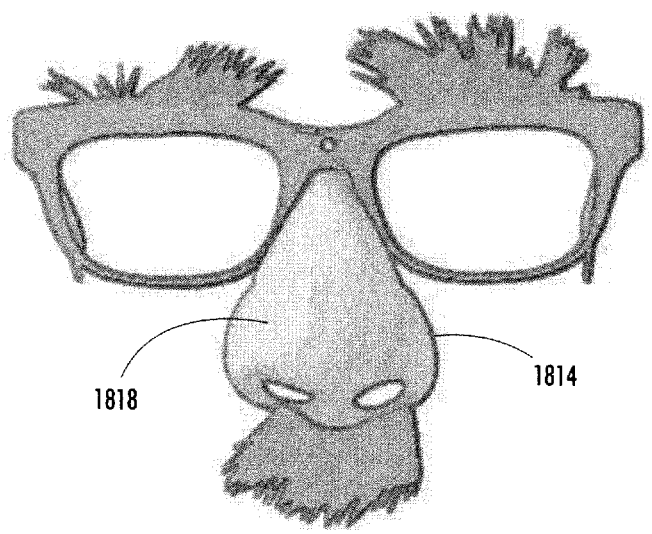
FIG. 18 represents an edge enhanced version of the image of FIG. 17.

For example, FIG. 17 represents a novelty image that might be received 314 for processing according to the method 310 for printing on or to be associated with a specular substrate. FIG. 18 is an edge enhanced version of that image including, for example, edges 18, 14 that have been darkened and regions 1818 that have been lightened or reduced in contrast with the darkened edges 1814. Accordingly, the edges have been enhanced, which tends to compensate 322 for blur. Additionally, the lightening or contrast reduction in areas such as 1818 tends to reduce 330 area coverage.

Figure 19:
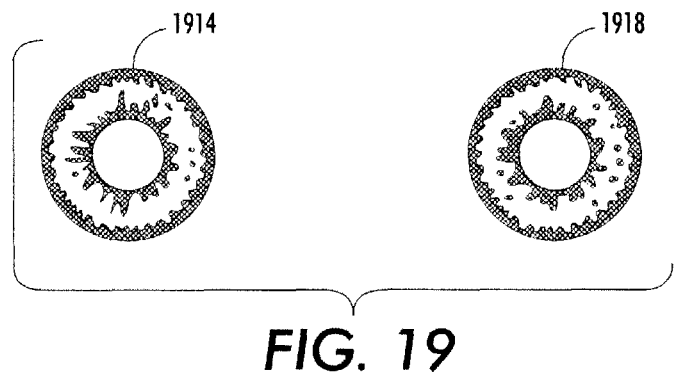
FIG. 19 represents a third input image.
Figure 20:
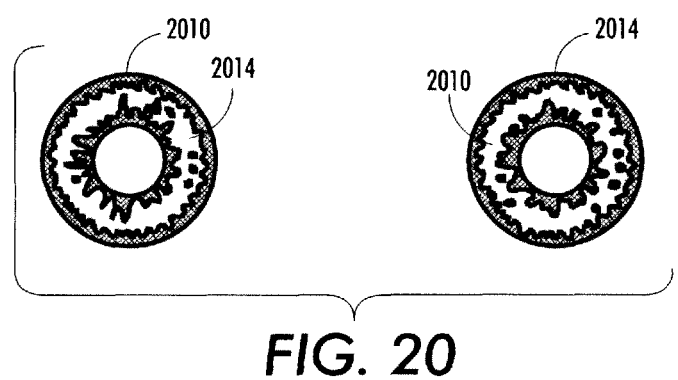
FIG. 20 represents an edge enhanced version of the image of FIG. 19.
Figure 21:
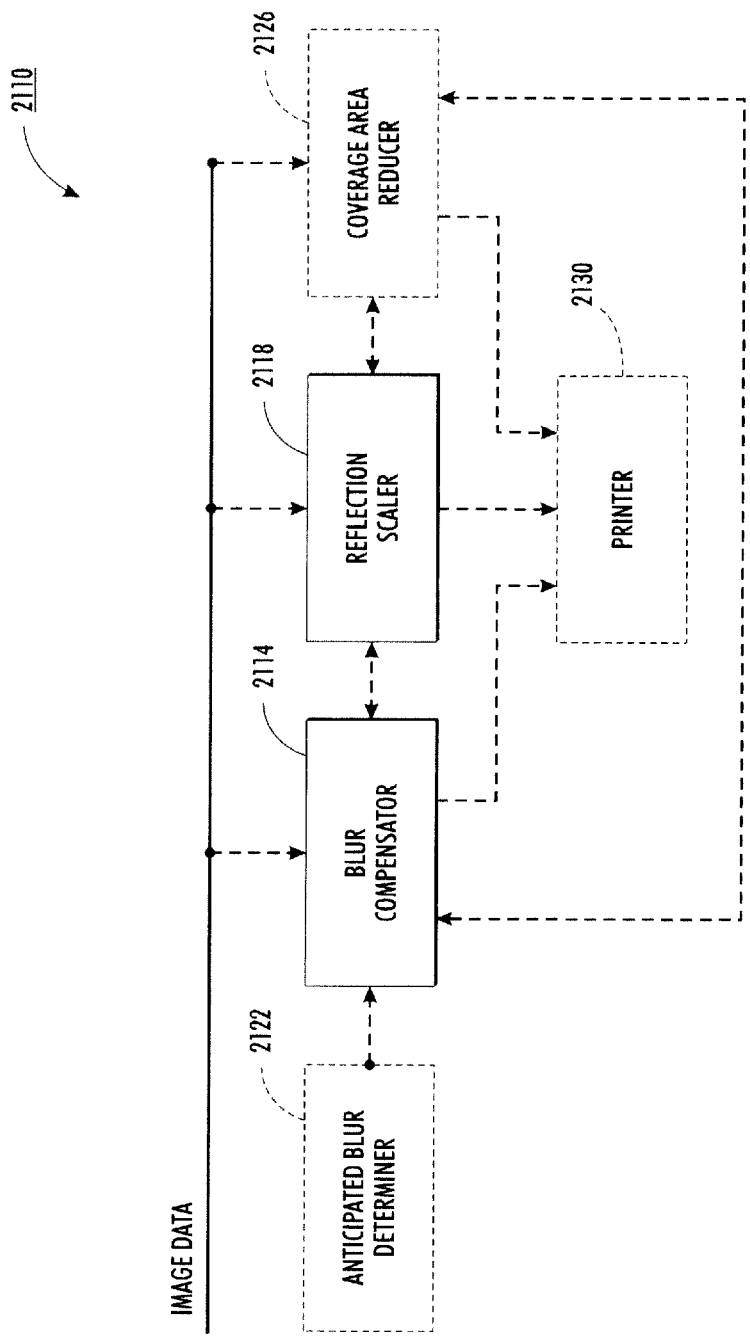
FIG. 21 is a block diagram of a portion of an image processing system that is operative to perform embodiments of the method of FIG. 3.

FIG. 19 represents an image that might be received 314 that includes colored irises 1914, 1918. FIG. 20 represents an edge enhanced version of data based on the image of FIG. 19 wherein inner 2010 and outer 2014 edges of the irises have been enhanced. Such an image might be printed 334 on specular substrate or on a transparency or transfer for later association with a mirror or specular substrate to allow a viewer (e.g., 114) to view themselves as they would appear with a different eye color.

A portion 2120 of an image processor that is operative to process an image for association with a specular medium to improve a manner in which the image appears to blend with a reflection of an anticipated viewer can include a blur compensator 2114 and a reflection scaler 2118. Optionally, the blur compensator 2114 can receive an anticipated blur from an anticipated blur determiner 2122. Also optionally, the portion 2110 of the image processor can include a coverage area reducer 2126 and/or a printer 2130.

Any one of the blur compensator 2114, reflection scaler 2118 and coverage area reducer 2126 can be operative to receive 314 image data. Additionally, any one of the blur compensator 2114, reflection scaler 2118 and coverage area reducer 2126 can be operative to provide process output data based on the received 314 image data to any of the others of the blur compensator 2114, reflection scaler 2118 and coverage area reducer 2126.

The blur compensator 2114 can be operative to process 322 data based on the received 314 image to compensate for blur that occurs because the viewer focuses on the reflection of the viewer from the specular media, which appears to become from a point further away and behind the printed 334 version of the image. For example, see the discussion related to FIG. 2. If practical, the blur compensator 2114 can process the data based on the received 314 image data according to a convolution with a zero mean Gaussian having a variance associated with an anticipated blur received from the blur determiner 2122. For example, as described with reference to FIG. 2, where the output image will be at a resolution of 600 dpi, the anticipated blur determiner 2122 may indicate to the blur compensator 2114 that the anticipated blur has a radius of 59 dots. In that case, the blur compensator 2114 can model the blur with a two-dimensional convolution with a blurring filter as expressed in Equations 2-4.

Alternatively, the blur compensator 2114 may apply over-sharpening as discussed above with regard to Equations 5 and 6 or edge mapping as discussed above with regard to the kernels depicted in FIGS. 7-10 as well as zero-cross determination and Canny edge detectors, the results of which are illustrated in FIGS. 11-16. Additionally, or alternatively, the blur compensator 2114 might compensate for blur by applying edge enhancement to the received 314 image as described with reference to FIGS. 17-20.

The reflection scaler 2118 operates to, at a minimum, verify that data based on the received 314 image is scaled to blend appropriately with an appropriate portion of a reflection of a target viewer (e.g., 114). Where an object represented in the data based on the received 314 image is not dimensioned appropriately, the scaler 2118 scales the image through image magnification or size reduction so that the object or objects represented in the data based on the received image are appropriately sized to be blended with a reflection of the intended viewer. For example, as described with reference to FIG. 1, an image of a viewer reflected from a specular media may be one-half the size of the viewer. Accordingly, the reflection scaler 2118 may scale the image so that the represented object is one-half the size (e.g., one-half the length and/or width) the represented object would be if it were actually associated with the viewer.

The coverage area reducer 2126, where it is included, may only quantize data based on the received image data through structure-on-structure (e.g., dot-on-dot) halftoning. Additionally, or alternatively, the coverage area reducer 2126 may apply over-sharpening, edge mapping or edge enhancement as described above to reduce the area an image would otherwise cover with colorant so that an increased amount of specularly reflective surface area is available to reflect an image of the viewer as depicted, for example, in FIGS. 11-16 and 18. For example, the coverage area reducer 2126 may process data based on the received 314 image to provide at least about 50% of an image region to reflect a target portion of the viewer.

The printer 2130, if included, is operative to print an image based on data processed through at least the blur compensator 2114 and reflection scaler 2118 on a specular substrate or on a transparent media or transfer medium which are to later be associated with a specular medium.

The blur compensator 2114, reflection scaler 2118, anticipated blur determiner 2122 and coverage area reducer 2126 can be implemented in various combinations of hardware and software. Where an embodiment includes software, the software is included in a computer storage medium and executed by one or more computational elements such as one or more microprocessor, microcontroller, application specific integrated circuits and field programmable gate arrays or devices, digital signal processor and/or other computer processor which is able to read the software from the computer storage medium and operate according to the software.

Additional system elements may be included. For example, an operator interface may allow an operator to communicate with the reflection scaler 2118 to identify an object in the received 314 image and/or to identify a target portion of a reflection for the object in the received 314 image to be associated with and for which it is to be scaled. Additionally, or alternatively, the operator interface may allow the operator to indicate a desired area coverage to the coverage area reducer 2126. Still further, an operator interface may allow an operator to indicate or select a blur compensation technique or parameters therefor to the blur compensator 2114.

Additionally, or alternatively, an operator interface may allow an operator to indicate a data flow or sequence of operation thereby directing the blur compensator 2114, reflection scaler 2118, or coverage area reducer 2126 to receive 314 the image and to deliver processed data based on the received 314 image in sequence to one or more of the other modules (2114, 2118, 2126, 2130).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The word "printer" as used herein encompass any apparatus, such as a digital copier, book-making machine, facsimile machine, multi-function machine, and the like, which performs a print outputting function for any purpose. The claims can encompass embodiments that process color or monochrome images or image data.

What is claimed is:

1. A method for processing an image for association with a specular medium to improve a manner in which a printed version of the processed image would appear to blend with a reflection of an anticipated associated viewer of the printed version of the processed image that is associated with the specular medium, the method comprising:
   receiving the image;
   processing data based on the image to compensate for anticipated blurring due to the anticipated associated viewer focusing on the reflection of the viewer rather than focusing on the printed version of the processed image;
   wherein the processing includes at least one of sharpening, edge mapping and edge enhancing, thereby generating a transformed version of the image;
   reducing an area coverage of data based on the image in a manner that reduces an area coverage of the printed version of the image to at least below fifty percent, thereby generating reduced area coverage data providing at least fifty percent area of the specular medium in a region of the printed image to reflect the image of the anticipated associated viewer wherein the data that is reduced in area coverage is based on the transformed version of the image or wherein the data that is processed is based on the reduced area coverage data; and
   printing the printed version of the image based on the transformed version of the image on at least one of:
   the specular medium, a transparent overlay to be applied to the specular medium, and a transfer medium to be used in transferring the printed transformed image to the specular medium.

2. The method of claim 1 comprising:
   determining an anticipated apparent size of a portion of the reflected image of the anticipated associated viewer to be blended by observation with an object depicted in the printed version of the image; and
   scaling data based on the image so that the depicted object would fit the anticipated apparent size of the reflected image, thereby generating a scaled version of the image, wherein the data that is scaled is based on the transformed version of the image or wherein the data that is processed is based on the scaled version of the image and wherein printing the printed version of the image is based on a scaled and transformed version of the image.

3. The method of claim 2 wherein scaling data based on the image comprises:
   scaling data based on the image so that the depicted object will be printed to be one half a size the depicted object would be if the depicted object were actually associated with the portion of the anticipated associated viewer, thereby compensating for an apparent reduction in size of the reflection associated with viewing the reflection.

4. The method of claim 1 comprising:
   quantizing data based on the image according to structure-on-structure halftoning to generate quantized image data prior to printing, wherein the printing comprises printing based on the quantized image data wherein the data that is quantized is based on the transformed version of the image or wherein the data that is processed is based on the quantized image data.

5. The method of claim 1 wherein processing data based on the image comprises:
   dividing the data based on a frequency representation of the image by a frequency representation of a Gaussian filter with a zero mean and a variance equivalent to the anticipated blurring, thereby transforming the image into a sharpened version of the image.

6. The method of claim 1 wherein processing the data based on the image to compensate for the anticipated blurring comprises:
   processing the data based on the image according to an approximation of an inverse Gaussian filter with zero mean.

7. The method of claim 6 wherein processing the data based on the image according to an approximation to an inverse Gaussian filter comprises:
   applying at least one of a Sobel, Prewitt, Roberts, Laplacian of Gaussian, zero-cross and Canny edge detection method to the data based on the image.

8. The method of claim 1
   wherein reducing the area coverage comprises at least one of quantizing the data based on the image according to structure-on-structure halftoning to generate quantized image data prior to printing;
   wherein the printing comprises printing based on the quantized image data and applying at least one of a Sobel, Prewitt, Roberts, Laplacian of Gaussian, zero-cross and Canny edge detection method to the data based on the image.

9. An image processor that is operative to process an image for association with a specular medium to improve a manner in which a printed version of the processed image would appear to blend with a reflection of an anticipated associated viewer of the printed version of the processed image that is associated with the specular medium, the image processor comprising:
   a blur compensator that is operative to receive data based on the image and process the data based on the image to compensate for anticipated blurring due to the anticipated associated viewer focusing on the reflection of the viewer rather than focusing on the printed version of the image;
   wherein the processing includes at least one of sharpening, edge mapping and edge enhancing, thereby generating a transformed version of the image;
   a coverage area reducer that is operative to reduce an area coverage of data based on the image in a manner that reduces an area coverage of the printed version of the image to at least below fifty percent thereby generating reduced area coverage data providing at least fifty percent area of the specular medium in a region of the printed image to reflect the image of the anticipated associated viewer wherein the data that is reduced in area coverage is based on the transformed version of the image from the blur compensator or wherein the data that is processed by the blur compensator is based on the reduced area coverage data; and
   a reflection scaler that is operative to determine an anticipated apparent size of a portion of the reflected image of the anticipated associated viewer to be blended by observation with an object depicted in the printed version of the image and to scale data based on the image so that the depicted object would fit the anticipated apparent size of the reflected image, thereby generating a scaled version of the image, wherein the data that is scaled is based on the transformed version of the image generated by the blur compensator or wherein the data that is processed by the blur compensator is based on the scaled version of the image, thereby generating a scaled and transformed version of the image.

10. The image processor of claim 9 comprising:
a printer that is operative to print the printed version of the image based on the scaled and transformed version of the image on at least one of: the specular medium, a transparent overlay to be applied to the specular medium and a transfer medium to be used in transferring the printed image to the specular medium.

11. The image processor of claim 9 wherein the reflection scaler is operative to scale the data based on the image so that the depicted object will be printed to be one half a size the depicted object would be if the depicted object were actually associated with the portion of the anticipated associated viewer, thereby compensating for an apparent reduction in size of the reflection associated with viewing the reflection.

12. The image processor of claim 9
wherein the coverage area reducer is operative to quantize data based on the image according to structure-on-structure halftoning to generate quantized image data prior to printing;
wherein the printing comprises printing based on the quantized image data wherein the data that is quantized is based on the transformed version of the image or wherein the data that is processed is based on the quantized image data.

13. The image processor of claim 9 wherein the blur compensator is operative to convolve the data based on the image with an inverse Gaussian filter with a zero mean and a variance equivalent to the anticipated blurring, thereby being operative to transform the image into a sharpened version of the image.

14. The image processor of claim 9 wherein the blur compensator is operative to process the data based on the image according to an approximation of an inverse Gaussian filter with zero mean.

15. The image processor of claim 14 wherein the blur compensator is operative to process the data based on the image by applying at least one of a Sobel, Prewitt, Roberts, Laplacian of Gaussian, zero-cross and Canny edge detection method to the data based on the image.

16. The image processor of claim 9
wherein the coverage area reducer is operative to reduce the area coverage by at least one of quantizing the data based on the image according to structure-on-structure half toning to generate quantized image data prior to printing;
wherein the printing comprises printing based on the quantized image data and applying at least one of a Sobel, Prewitt, Roberts, Laplacian of Gaussian, zero-cross and Canny edge detection method to the data based on the image.

* * * * *